United States Patent [19]

Mahrus et al.

[11] Patent Number: 5,056,936
[45] Date of Patent: Oct. 15, 1991

[54] MULTILAYER PLAIN BEARING

[75] Inventors: Duraid Mahrus; Ademir Carubelli, both of Sao Paulo, Brazil

[73] Assignee: Metal Leve S. A. Industria E Comercio, Sao Paulo, Brazil

[21] Appl. No.: 422,915

[22] Filed: Oct. 17, 1989

[30] Foreign Application Priority Data

Oct. 17, 1988 [BR] Brazil .................. PI 8805486

[51] Int. Cl.⁵ .................. F16C 33/12; F16C 9/02
[52] U.S. Cl. .................. 384/276; 384/294
[58] Field of Search .............. 384/129, 276, 294, 912, 384/913

[56] References Cited

U.S. PATENT DOCUMENTS

| 3,055,717 | 9/1962 | Schmidt | 384/294 X |
| 3,623,205 | 11/1971 | Scott | 384/276 X |
| 4,553,856 | 11/1985 | Bierlein et al. | 384/276 |
| 4,562,122 | 12/1985 | Hodes et al. | 384/276 X |

FOREIGN PATENT DOCUMENTS

| 1092268 | 11/1960 | Fed. Rep. of Germany | 384/276 |
| 41425 | 2/1987 | Japan | 384/129 |
| 702188 | 1/1954 | United Kingdom | 384/276 |
| 711438 | 6/1954 | United Kingdom | 384/276 |

Primary Examiner—Thomas R. Hannon
Attorney, Agent, or Firm—Darby & Darby

[57] ABSTRACT

A multilayer plain bearing composed of a backing layer, an intermediate layer and a diffusion or bonding layer, and a sliding layer, the sliding layer being of a laminate structure formed by the alternate deposition of layers of a softer material and layers of a harder material.

9 Claims, 1 Drawing Sheet

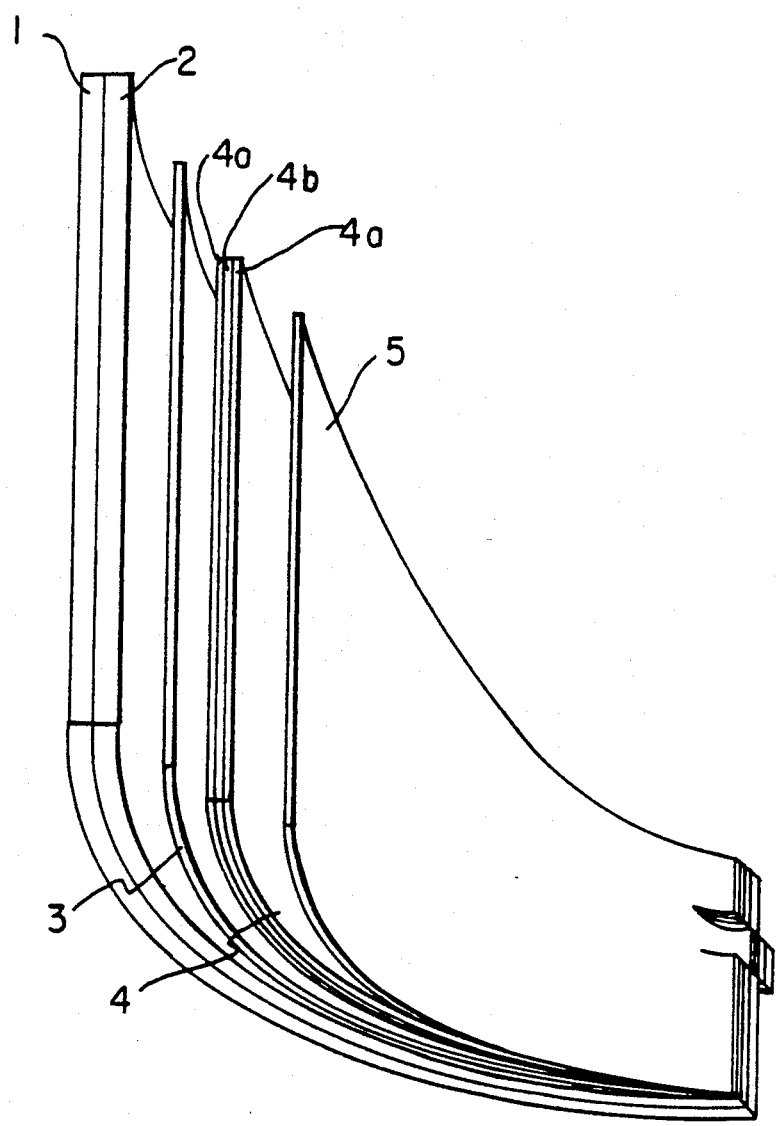

MULTILAYER PLAIN BEARING

BACKGROUND OF THE INVENTION

This invention relates to a plain bearing intended for use in internal combustion engines. More particularly, the present invention relates to a multilayer plain bearing for engine connecting rods and crankshafts.

Multilayer plain bearings are well known in the art and widely used. One typical multilayer bearing is the so-called trimetal bearing, composed of a backing plate, usually of steel or aluminum, one intermediate layer, generally an aluminum or copper alloy, sometimes a diffusion or bonding layer, of nickel, aluminum, zinc or alloys thereof, and a sliding layer, generally a copper-tin-lead alloy. This type of bearing exhibits good properties as regards resistance to fatigue and wear, embeddability of foreign particles, conformability to accommodate shaft misalignments, and corrosion resistance.

However, for certain applications it would be desirable and advantageous to have a plain bearing the sliding layer of which, at the same time as it would keep the properties of corrosion resistance, embeddability and conformability unchanged, would have its material structured in such a manner as to impart to the sliding layer a higher resistance to wear and especially to fatigue which, as is known, is caused by cyclic loads on the bearing. It is, therefore, the main object of the present invention to provide a multilayer plain bearing having a sliding layer exhibiting at the same time excellent properties of embeddability, conformability, and corrosion, wear and fatigue resistance.

BRIEF DESCRIPTION OF THE INVENTION

Based on the need for such desirable features, applicant has discovered and developed a concept under which the plain bearing sliding layer is characterized by a structure composed of multiple layers and provided with a higher fatigue and wear resistance. More particularly, the sliding layer of the present invention is composed of alternate layers of softer and harder materials, the sliding layer of the invention being provided with at least two layers of a softer material and at least one layer of a harder material between the layers of softer material.

According to one preferred embodiment of the invention, the laminate structure of the sliding layer is made up of the alternate deposition or formation of a copper-tin-lead layer and cooper or copper-tin alloy layers, the copper-tin-alloy having a tin content of 1 to 40 um by weight percent, with or without lead inclusions. The role of the copper in the laminate structure is an increase in the material hardness. Accordingly, the load capacity of the bearing is increased thereby improving the fatigue resistance of both the sliding layer and the intermediate layer.

DETAILED DESCRIPTION OF THE INVENTION

The bearing object of the present invention is illustrated schematically in the accompanying drawing, the only figure of which shows a portion of the bearing including a backing layer (1), generally of steel or aluminum; an intermediate layer (2), usually of aluminum or a copper alloy; a diffusion or bonding layer (3); two layers of a softer material (4a), generally a copper-tin-lead alloy, separated from each other by a layer of a harder material (4b), usually copper or a copper-tin alloy either with or without lead inclusions, the said layers (4a) and (4b) composing the sliding layer (4). The first layer, deposited on the diffusion or bonding layer (3) or, in the absence of such a layer (3), directly on the intermediate layer (2), and the layer that constitutes the outer face of the sliding layer (4), are always made of a softer material (4a). The layer (5) constitutes the corrosion protection of the sliding layer.

A casting, electroplating or physical vapor deposition (sputtering) method can be employed for making the laminate sliding layer of the present invention. The total thickness of the laminate sliding layer (4) is the same as that of the traditional sliding layer, i.e., as if there were no copper or copper-tin alloy layers. This thickness is generally from 2 to 30 um. The thickness of each layer of the softer material (4a), i.e., copper-tin-lead alloy, is 1 to 20 um.

The thickness of each layer of the harder material (4b), i.e., copper or a copper-tin alloy, is 0.3 to 4 um.

The number of copper-tin-lead alloy layers and copper or copper-tin layers shown in the drawings is exemplary only. These layers can be present in any number as a function of the bearing load conditions.

The sliding layer 4 may be constructed with softer layers (4a) comprising 2.5% to 5.5% by weight of copper, 8% to 12% by weight of tin, with the remainder or balance being lead.

For example, a sliding layer 4 may be constructed with softer layers (4a) comprising 3% by weight of copper, 10% by weight of tin, with the remainder or balance being lead.

Tests made by applicant demonstrated that the bearing object of the present invention exhibits a higher load capacity, which translates into an increase of its fatigue resistance. Friction and wear tests have also shown a lower wear of the sliding layer. On the other hand, all other important properties of the sliding layer-good corrosion resistance, and good embeddability and conformability have been maintained.

The bearing object of the invention is described and illustrated by way of example as a trimetal bearing. It is obvious that the concept of this invention, of a sliding layer having a laminate structure, is applicable to the bearings known as bimetal type bearings likewise, in which the sliding is deposited directly on the backing layer.

What is claimed is:

1. A multilayer plain bearing for internal combustion engines, said bearing being of the type comprising a backing layer, and one of a diffusion and bonding layer adjacent to said backing layer, and a sliding layer adjacent to said one of a diffusion and bonding layer, said sliding layer having a laminate structure of separate alternated layers of a softer material and a harder material, said laminate structure having at least two layers of softer material and at least one layer of harder material positioned between two layers of softer material, both the layer of said laminate structure closest to said backing layer and the layer of said laminate structure farthest from said backing layer being formed of softer material.

2. A multilayer plain bearing as in claim 1, wherein the sliding layer has a thickness from 2 to 30 um.

3. A multilayer plain bearing as in claim 1, wherein each layer of the softer material has a thickness from 1 to 20 um, and each layer of the harder material has a thickness from 0.3 to 40 um.

4. A multilayer plain bearing as in claim 1, wherein the sliding layer is formed by any method selected from casting, electroplating and physical vapor deposition.

5. A multilayer plain bearing for internal combustion engines, said bearing being of the type comprising a backing layer, and one of a diffusion and bonding layer adjacent to said backing layer, and a sliding layer adjacent to said one of a diffusion and bonding layer, said sliding layer having a laminate structure, said laminate structure having at least two layers of softer material and at least one layer of harder material positioned between two layers of softer material, both the layer of said laminate structure closest to said backing layer and the layer of said laminate structure farthest from said backing layer being formed of softer material, wherein the layers of the softer material are made of a copper-tin-lead alloy, and the layers of the harder material are made of a material selected from the group consisting of copper and a coppper-tin alloy.

6. A multilayer plain bearing as in claim 5, wherein the content of tin in the copper-tin alloy of the harder material layer is from 1 to 40% by weight.

7. A multilayer plain bearing as in claim 5, wherein the copper-tin alloy of the harder material layer contains lead inclusions.

8. A multilayer bearing as in claim 5, wherein the softer layer comprises
2.5 to 5.5% by weight of copper
8 to 12% by weight of tin
balance lead.

9. A multilayer plain bearing as in claim 8, wherein the softer layer comprises
3% by weight copper
10% by weight tin
balance lead.

* * * * *